US007158095B2

United States Patent
Jenson et al.

(10) Patent No.: US 7,158,095 B2
(45) Date of Patent: Jan. 2, 2007

(54) VISUAL DISPLAY SYSTEM FOR DISPLAYING VIRTUAL IMAGES ONTO A FIELD OF VISION

(75) Inventors: Barton James Jenson, Bothell, WA (US); Kenneth Eugene Bean, II, Woodinville, WA (US); David Paul George, Woodinville, WA (US)

(73) Assignee: Big Buddy Performance, Inc., Woodinville, WA (US)

( * ) Notice: Subject to any disclaimer, the term of this patent is extended or adjusted under 35 U.S.C. 154(b) by 92 days.

(21) Appl. No.: 10/622,197

(22) Filed: Jul. 17, 2003

(65) Prior Publication Data

US 2005/0012682 A1    Jan. 20, 2005

(51) Int. Cl.
*G09G 5/00* (2006.01)

(52) U.S. Cl. .................... 345/7; 345/632; 345/611; 345/8; 345/9; 345/207

(58) Field of Classification Search ........... 345/7–9, 345/169, 611, 102, 207, 632; 359/15, 630, 359/894, 619, 640; 353/20; 704/275; 349/65; 280/735; 348/222.1

See application file for complete search history.

(56) References Cited

U.S. PATENT DOCUMENTS

| | | | | |
|---|---|---|---|---|
| 3,915,548 A * | 10/1975 | Opittek et al. | ............. | 345/7 |
| 5,053,755 A * | 10/1991 | Smith et al. | ................ | 345/7 |
| 5,079,416 A * | 1/1992 | Filipovich | .......... | 250/214 VT |
| 5,143,796 A * | 9/1992 | Sebastiano et al. | ......... | 428/623 |
| 5,212,471 A * | 5/1993 | McDonald | .................. | 345/7 |
| 5,576,886 A * | 11/1996 | Ferrante | ................. | 359/630 |
| 5,602,679 A * | 2/1997 | Dolgoff et al. | ............ | 359/640 |
| 5,900,982 A * | 5/1999 | Dolgoff et al. | ............ | 359/619 |
| 5,963,280 A * | 10/1999 | Okuda et al. | ................ | 349/65 |
| 6,144,424 A * | 11/2000 | Okuda et al. | ................ | 345/65 |
| 6,609,795 B1 * | 8/2003 | Weber et al. | ................ | 353/20 |
| 6,820,897 B1 * | 11/2004 | Breed et al. | ................ | 280/735 |
| 6,977,630 B1 * | 12/2005 | Donath et al. | ................ | 345/7 |
| 2002/0048058 A1 * | 4/2002 | Nishikawa et al. | .......... | 359/15 |
| 2002/0069071 A1 * | 6/2002 | Knockeart et al. | ......... | 704/275 |
| 2003/0076423 A1 * | 4/2003 | Dolgoff | .................. | 348/222.1 |
| 2004/0008412 A1 * | 1/2004 | Jiang et al. | ................. | 359/487 |
| 2004/0066376 A1 * | 4/2004 | Donath et al. | ............. | 345/169 |
| 2004/0066547 A1 * | 4/2004 | Parker et al. | ................ | 359/15 |
| 2004/0109251 A1 * | 6/2004 | Freeman | .................. | 359/894 |
| 2004/0135742 A1 * | 7/2004 | Weber et al. | ................ | 345/7 |
| 2005/0041297 A1 * | 2/2005 | He et al. | .................... | 359/631 |

* cited by examiner

*Primary Examiner*—Bipin Shalwala
*Assistant Examiner*—Prabodh Dharia
(74) *Attorney, Agent, or Firm*—Olympic Patent Works PLLC

(57) ABSTRACT

An optically transparent, ghost-free visual display system that superimposes a virtual image comprising graphical or textual information onto a field of vision. Embodiments of the visual display system utilize illumination and optical components that introduce a virtual image onto a field of vision while minimally obstructing and/or attenuating other objects within the field of vision. Embodiments of the visual display system can be used in numerous applications, including head-up displays ("HUDs") for automotive, tracked and rail-mounted vehicles, marine, aerospace applications, see-through speech prompt displays, and see-through projection displays.

20 Claims, 8 Drawing Sheets

VISUAL DISPLAY SYSTEM FOR DISPLAYING VIRTUAL IMAGES ONTO A FIELD OF VISION

TECHNICAL FIELD

The present invention relates to visual display of textual and graphical information and images, and, in particular, to optically transparent visual display systems which superimpose ghost-free virtual images onto a field of vision with minimal obstruction of the field of vision.

BACKGROUND OF THE INVENTION

Head-up displays were originally developed, during the past 30 years, for displaying cockpit instruments to pilots, first in military, and now in both military and commercial aircraft. HUD technology has been more recently applied to additional applications. Various types of head-up display ("HUD") systems have been produced, each designed to a unique set of requirements and each possessing certain advantages. HUDs are utilized, for example, to display vehicle sensory and navigation information. A HUD eliminates the need for a vehicle operator to divert his or her eyes from a field of vision, such as from the road, in an automobile application, in order to view important information that may include a vehicle speed relative to various different environmental objects or media, a vehicle orientation relative to various different environmental objects or media, a compass heading, engine performance information, various temperatures, and information provided by other types of sensors and instruments. HUD implementations generally involve placement of optical, mechanical, and electrical components directly between the operator and the operator's necessary field of vision. Generally, these components must meet a set of functional and performance requirements, specific to particular applications, including requirements related to display-light-source brightness, contrast ratio, image quality, minimal obstruction of a viewer's field of vision, minimal attenuation and discoloration of light incoming from a field of vision, suppression of multiple reflections commonly referred to as "ghost images," "ghosts," or "ghosting," and acceptable aesthetic appearance.

Ambient lighting during daytime viewing demands a minimum brightness of 1000 foot-Lamberts from a typical display. This requirement is achieved in many HUDs by choosing bright illumination sources or designing efficient combiner or relay optics. The more efficient the optics, the more they tend to intrude on a viewer's field of vision; conversely, less efficient optics impose greater demands on the illumination source and drive up systems costs. For example, many existing HUDs use vacuum-fluorescent displays ("VFDs"), because of their high light output, high power light-emitting diodes ("LEDs"), or other bright illumination sources. To offset the demands on the illumination source, HUD implementations may utilize a dielectric or metallic optical coating, which maximizes the amount of light directed toward a viewer's field of vision. However, these optical coatings impart a tinted or colored appearance on optical components located between the viewer and the viewer's field of vision. Attenuation or interference effects of the coatings can produce undesirable appearances. Furthermore, government regulations restrict the degree of attenuation permissible, for example, for an automobile windshield, thereby limiting the extent to which the HUD design can use optical coatings directly mounted on a windshield.

Other HUD implementations rely on Fresnel reflection from a clear optic disposed in the viewer's field of vision, but they require additional mechanical components or wedged combiner optics to mitigate ghost images, or special conditioning of the illumination source to ensure adequate reflection efficiency. Ghost images are caused by multiple reflections from optical boundaries. One HUD implementation for automobiles utilizes slats or louvers embedded in the windshield or optic to be disposed adjacent to the windshield. While this approach extinguishes ghost images and employs a clear optic, the slats obscure the driver's field of vision to some degree. Moreover, the multiple-slat optic is more difficult to manufacture than a single piece optic. Another HUD implementation utilizes a wedged optic that ensures all multiple reflections are optically coincident, thereby superimposing multiple reflections. But, the wedged optic laterally displaces the image. Furthermore, the wedged optic increases the amount of material needed for manufacture of the system, limiting system compactness and increasing system cost.

Conditioning of illumination sources is also needed for existing, optically clear HUD implementations, especially those employing Fresnel reflection and/or dielectric coatings, because illumination sources do not always yield desirable light characteristics at a point of viewing. A specific polarization state from the illumination source is required for many HUD implementations to ensure that an acceptable level of reflection occurs on at least one of the optical boundaries. The physics of Fresnel reflections are such that existing automotive HUD implementations deliver display information with s-polarized light, although p-polarized sunglasses, which are often used by drivers to reduce glare, effectively extinguish s-polarized light beyond visibility. An automotive HUD producing display information in s-polarized light is therefore useless to a driver who is wearing polarized sunglasses.

Thus, current HUD devices suffer from field-of-vision obstruction, display attenuation, interference effects, and ghost images. Manufacturers, designers, and users of HUD devices have therefore recognized the need for a visual display system that minimizes obstruction, attenuation, interference effects, that largely eliminates multiple reflections within a user's field of vision, and that delivers light with desirable polarization characteristics for particular applications.

SUMMARY OF THE INVENTION

One embodiment of the present invention is an optically transparent visual display system that superimposes a ghost-free virtual image comprising graphical or textual information onto a field of vision. The disclosed visual display system utilizes a combination of illumination and optical components that introduce a virtual image into a field of vision while minimally obstructing and/or attenuating other objects within the field of vision. The disclosed visual display system can be used in numerous applications, including head-up displays ("HUDs") for automotive, tracked, and rail-mounted vehicles, marine and aerospace applications, see-through speech prompt displays, and see-through projection displays.

DETAILED DESCRIPTION OF THE INVENTION

Figure 1:
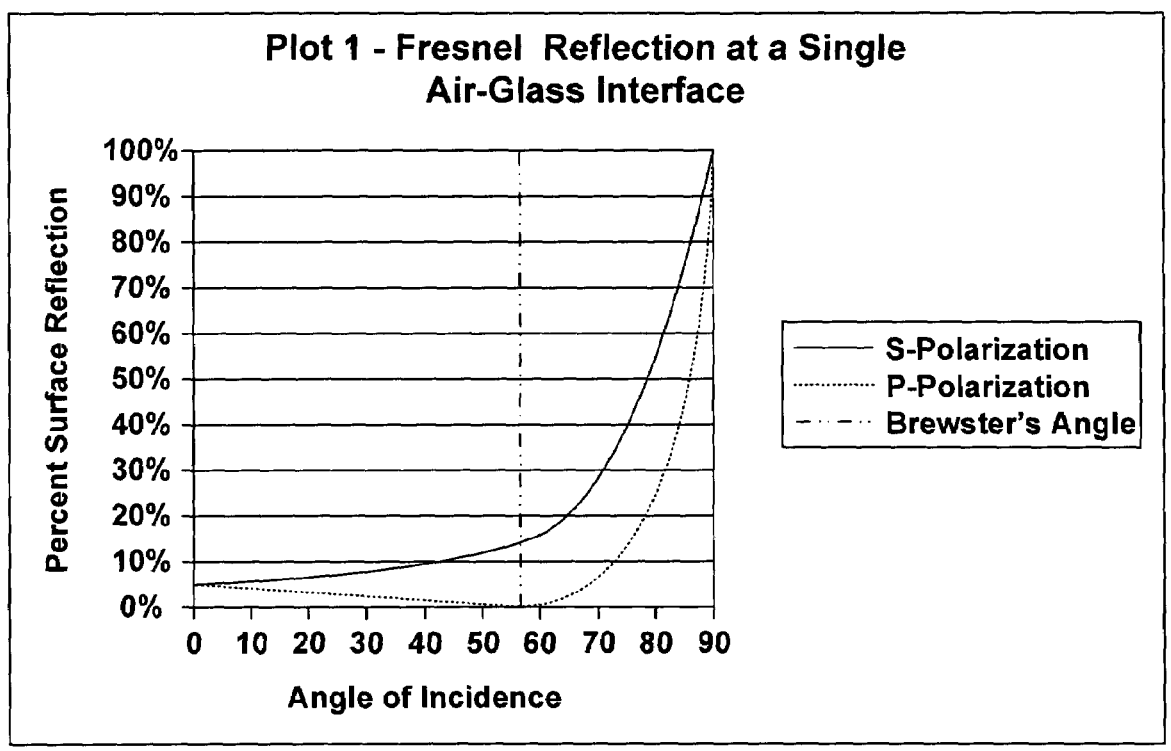
FIG. 1 shows the reflection curves for a single air-glass interface, where the index of refraction of glass is 1.523 and air is 1.000.

One embodiment of the present invention is the combination of a display projection system, imaging optics, a combiner that reflects displayed textual and graphical information, combining the light from the display projection system with light emanating from objects behind the combiner to superimpose the textual and graphical information onto a field of vision of a viewer, and, optionally, a vision-enhancing optic. These components together compose a transparent visual display system that presents textual and graphical information to a viewer in the viewer's field of vision. In other words, a viewer sees a roadway, airspace, or other scene with a virtual image of textual and/or graphical information superimposed within the field of vision, appearing partly transparent to the viewer.

Three alternative combiner embodiments are disclosed. The disclosed combiner embodiments include: (1) a first combiner embodiment that utilizes an optic designed to optimize Fresnel reflection while employing a polarization rotator; (2) a second combiner embodiment that utilizes an optic with dielectric coating, that provides partial reflection, and that may also utilize a polarization rotator; and (3) a third combiner embodiment that utilizes an optic with a metallic coating to provide desired partial reflection and that may also utilize a polarization rotator. Certain combiner embodiments utilize flat combiner surfaces, but curved combiner surfaces are alternatively used, in alternate embodiments, for imaging purposes. Two general embodiments of the display-projection system are provided to originate, illuminate, and direct display information toward the combiner. A first display-projection-system embodiment generates display light that is s-polarized and is used in conjunction with any of the disclosed combiner embodiments. A second display-projection-system embodiment generates p-polarized light and is used in conjunction with the third combiner embodiment, mentioned above, without the polarization rotator. Several variations of the two display-projection systems utilize various illumination sources and display technologies. Imaging optics may be placed between the display-projection system and a combiner in order to create a virtual image of the display information at a comfortable viewing distance and at a selected magnification. The vision-enhancing optic may condition the polarization state of display information, and may also provide further imaging possibilities.

The first combiner embodiment employs Fresnel reflection, which occurs when there is a change in the optical material through which a ray of light is traveling. For example, a typical glass window is designed to be transparent, but partial mirror-like reflections of surrounding objects can be seen from either of its surfaces. The two optical materials in this example are air and glass, optically characterized by their index of refraction, while the front and back surfaces are optical boundaries that each give rise to the double-image, reflected objects. Fresnel reflection efficiency R at a boundary depends on three physical factors: (1) the difference in the index of refraction between the adjacent optical mediums; (2) the angle of incidence of the incident light; and (3) the polarization state of the incident light. The Fresnel reflection efficiency R is mathematically expressed as follows:

$$R = \frac{1}{2}\left[\frac{\sin^2(I-I')}{\sin^2(I+I')} + \frac{\tan^2(I-I')}{\tan^2(I+I')}\right]$$

where I is the angle of incidence with respect to the surface normal, and

I' is the angle of refraction with respect to the surface normal.

Snell's law provides the angles of incidence and refraction employed in the above equation. The first term gives the reflection of the s-polarized light, which is polarized perpendicular to the plane containing the incident and reflected rays. The second term gives the reflection of the p-polarized light, which is polarized parallel to the same plane. FIG. 1 shows the reflection curves for a single air-glass interface, where the index of refraction of glass is 1.523 and air is 1.000. As shown in FIG. 1, the air-glass interface becomes more mirror-like at larger angles of incidence, and s-polarized light exhibits higher reflection efficiency than p-polarized light at angles other than at the normal incidence (0°) and the grazing incidence (90°). Of particular importance, p-polarized light exhibits zero reflection efficiency at 56.7 degrees, referred to as "Brewster's angle." The above-described physical phenomena need to be considered when designing a combiner that relies on Fresnel reflection.

Figure 2:
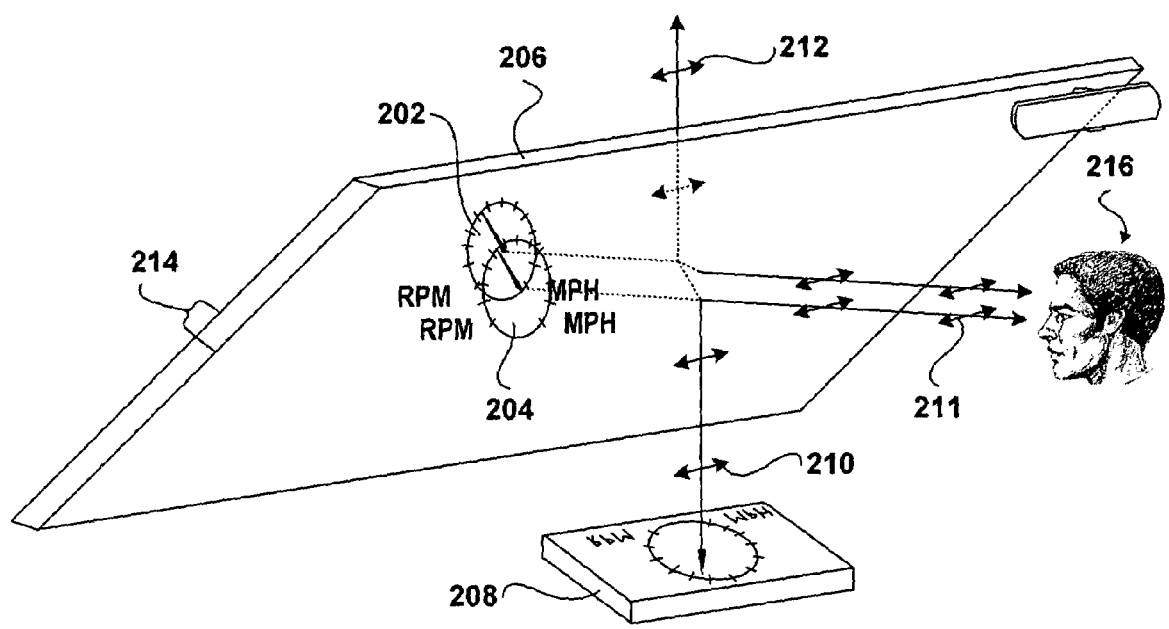
FIG. 2 shows an isometric view of a visual display system with a stand-alone windshield and with undesirable ghost images in an automotive-HUD application.

An advantage of using Fresnel reflection in a combiner for a visual display system is that the material chosen can be arbitrarily clear, minimally attenuating light from a given field of vision. Disadvantages of using Fresnel reflection in a combiner for a visual display system include low reflection efficiency, unless larger angles of reflection are used, constraints on the polarization state of the display light source, limited choice of optical materials, and double images due to the finite thickness of the combiner. FIG. 2 shows an isometric view of a visual display system with a stand-alone windshield and with undesirable ghost images in an automotive-HUD application. In FIG. 2, an undesirable image double 202 is slightly offset from a primary image 204 when a stand-alone windshield 206 is used as a combiner for an automotive head up display. A display light source 208 must be designed to utilize mostly s-polarized light, indicated by horizontal, double-headed arrows 210–212, in order to maximize reflection efficiency. A large amount of light produced by the display light source is lost by transmission 212 through the windshield 206. The finite thickness 214 of the windshield 206 gives rise to the double image 202 and 204 seen by a viewer 216.

The first combiner embodiment is constructed from a birefringent material or from a birefringent film bonded to a non-birefringent substrate, so that incident, s-polarized light that is transmitted beyond the first surface will be rotated 90 degrees in its polarization state. In particular, this is accomplished by designing the combiner to act as a half-wave retarder with fast axis oriented 45 degrees from the polarization direction. When light from the display light source has an angle of incidence close to Brewster's angle, the portion of light transmitted beyond the first surface exhibits greatly diminished Fresnel reflection efficiency at all subsequent optical boundaries, resulting in attenuation of unwanted ghost images, and at Brewster's angle, exhibits essentially no Fresnel reflection efficiency, if perfectly polarized. Acceptable levels of attenuation of ghost reflections are dependent on the application, and are directly related to the amount of deviation from Brewster's angle of the angle of incidence of the light from the display light source. Since the first combiner relies strictly on Fresnel reflection, the first combiner embodiment has a transparency equivalent to that of untreated glass or optical material. In alternative embodiments, a coating with a different index of refraction from that of the combiner may be used, or a wedged optic may be interposed between the display light source and the combiner, to change the angle of incidence of the light produced by the display light source to an angle close to Brewster's angle.

Figure 3:
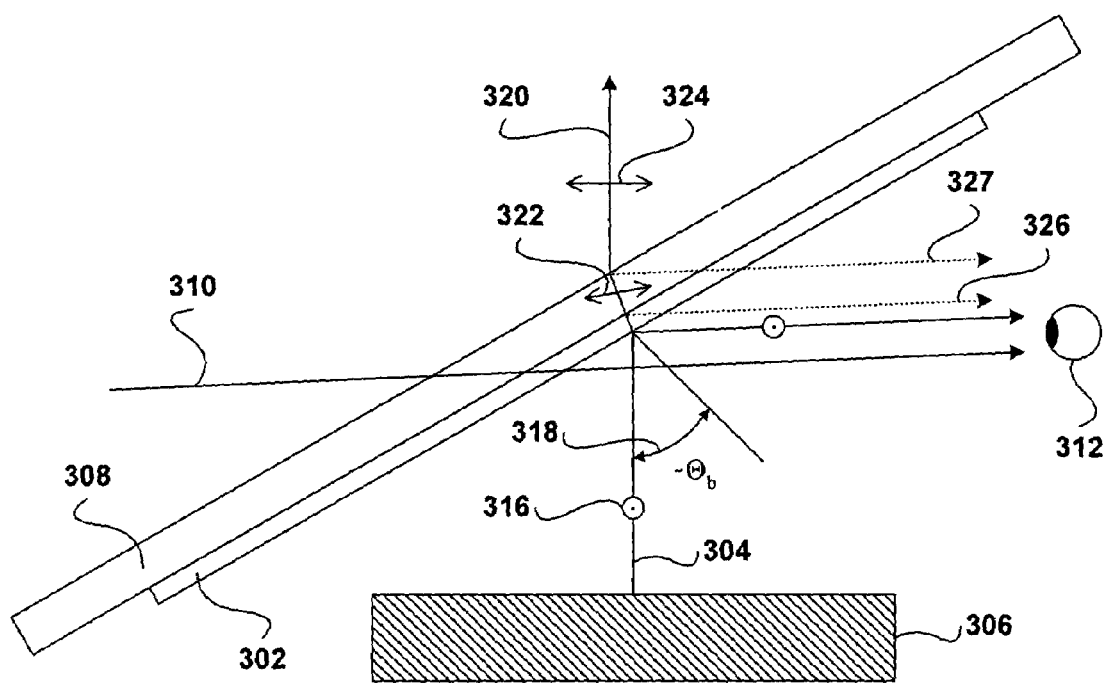
FIG. 3 shows a visual display system with an s-polarized display projector and a half-wave retarder film applied to a windshield in an automotive-HUD application.

FIG. 3 depicts an embodiment of the present invention used in an automobile for a head-up-display. A birefringent material 302, designed to act as a half-wave retarder for light 304 incident from a display unit 306, is applied to a windshield 308. The birefringent film, or retarder film, is optically transparent, imparting no discoloration and minimal attenuation of light 310, transmitted through the windshield 308 and birefringent film 302, from reflective objects on the opposite side of the windshield from a viewer 312, or, in other words, from objects within a field of vision of the viewer 312. Incident gauge display light is polarized perpendicular to a plane containing the incident 304 and reflected 314 rays, as shown by the symbols 316–317 on the incident and reflected light rays 304 and 314, and is therefore s-polarized light. Symbols 316–317 represent the polarization direction by depicting electric field vibrations that extend in and out of the page and perpendicular to the line in which the light ray travels, referred to as the "propagation vector." The angle of incidence 318 is close to, or equal to, Brewster's angle $\theta_b$ for the windshield material. Fresnel reflection from the first surface, which is s-polarized, permits viewing of the gauge display. Light from the display light source that is transmitted 320 through the windshield undergoes a 90-degree rotation of its polarization, shown by double-headed-arrow symbol 322, so that the polarization of the transmitted light is parallel to the plane containing the incident and reflected rays upon arrival at windshield surfaces. Symbol 322 represents the polarization direction by depicting electric field vibrations that extend within the plane of the page and perpendicular to the propagation vector. Subsequent Fresnel reflections, the polarizations of which are shown by symbol 324, are less efficient than the first surface reflection, and ghost images, represented by rays 326–327, are therefore attenuated. The retarder film can be sandwiched between two pieces of glass, embedded in the windshield, or applied to the windshield.

Figure 4:
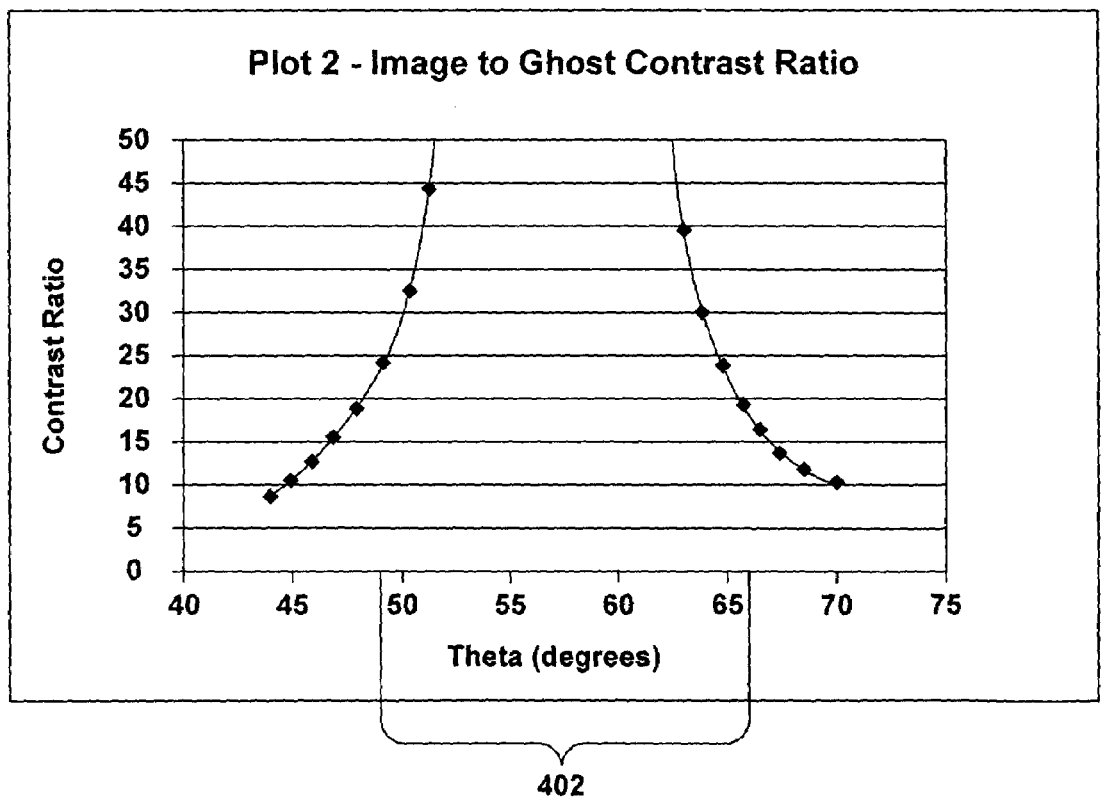
FIG. 4 shows the contrast ratios calculated for an example utilizing standard windshield glass of index 1.52, plastic retarder film of index 1.49, and s-polarized incident light.

Theoretical analysis of the ratio of energies found in the primary image and all ghost images, referred to as the "contrast ratio," allows for evaluation of performance characteristics associated with various embodiments of the present invention shown in FIG. 1. The contrast ratio is determined by applying the Fresnel equations and Snell's Law to each optical boundary and comparing the energies reflected back to a viewer. FIG. 4 shows the contrast ratios calculated for an example utilizing standard windshield glass of index 1.52, plastic retarder film of index 1.49, and s-polarized incident light. A superb, or high, contrast ratio, where the contrast ratio is defined as the primary-image reflection energy, $E_1$, divided by the sum of all ghost-image reflection energies, $E_2$ and $E_3$, occurs over a generous range of incident angles 402. An expression for the contrast ratio is provided below:

$$CR = \frac{E_1}{E_2 + E_3}$$

where CR is the contrast ratio,
  $E_1$ is the reflected energy from the front surface of the retarder film,
  $E_2$ is the reflected energy from the windshield/retarder film interface, and
  $E_3$ is the reflected energy from the back surface of the windshield.

Figure 5:
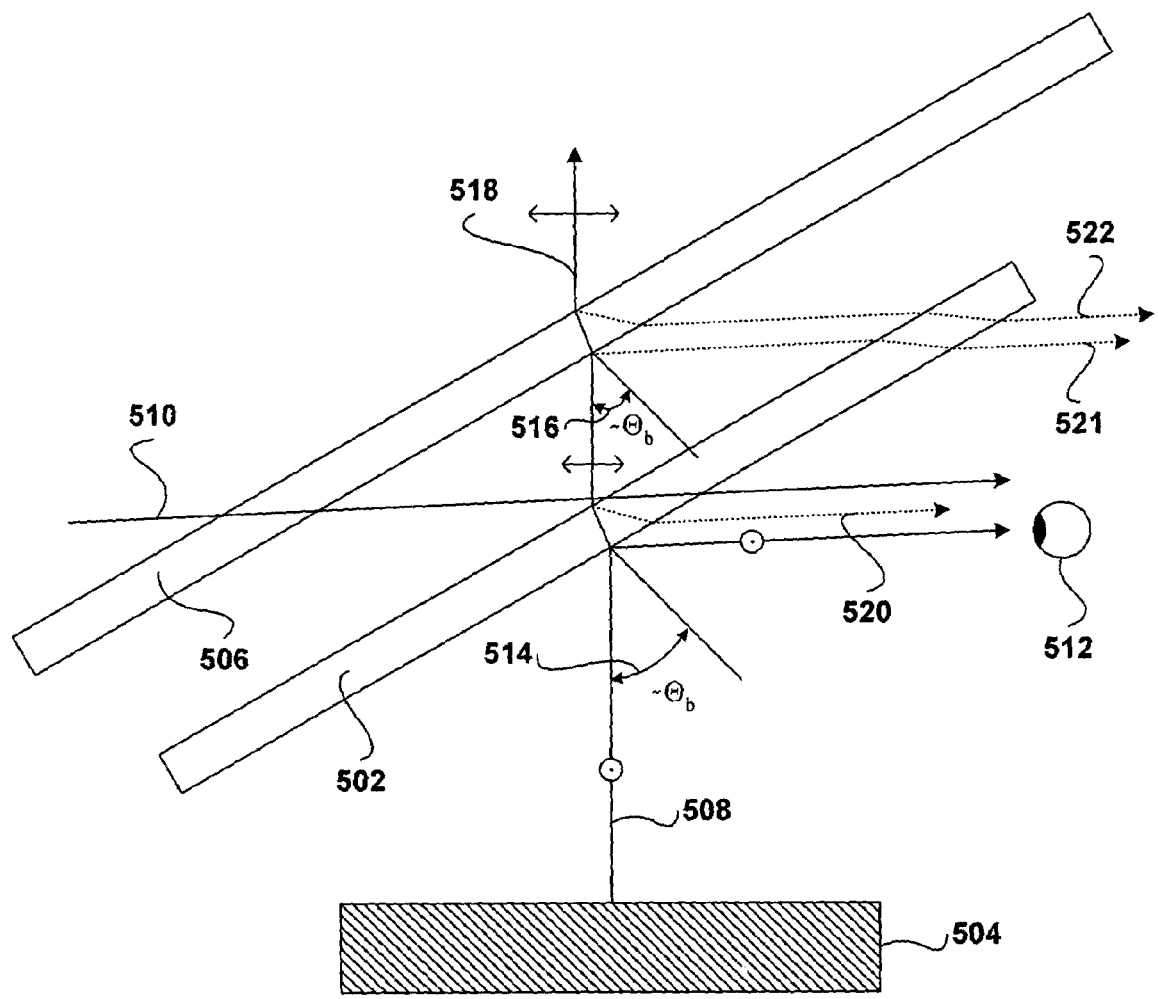
FIG. 5 shows a visual display system with an s-polarized display projector and a half-wave retarder/combiner separate from the windshield in an automotive-HUD application.
Figure 6:
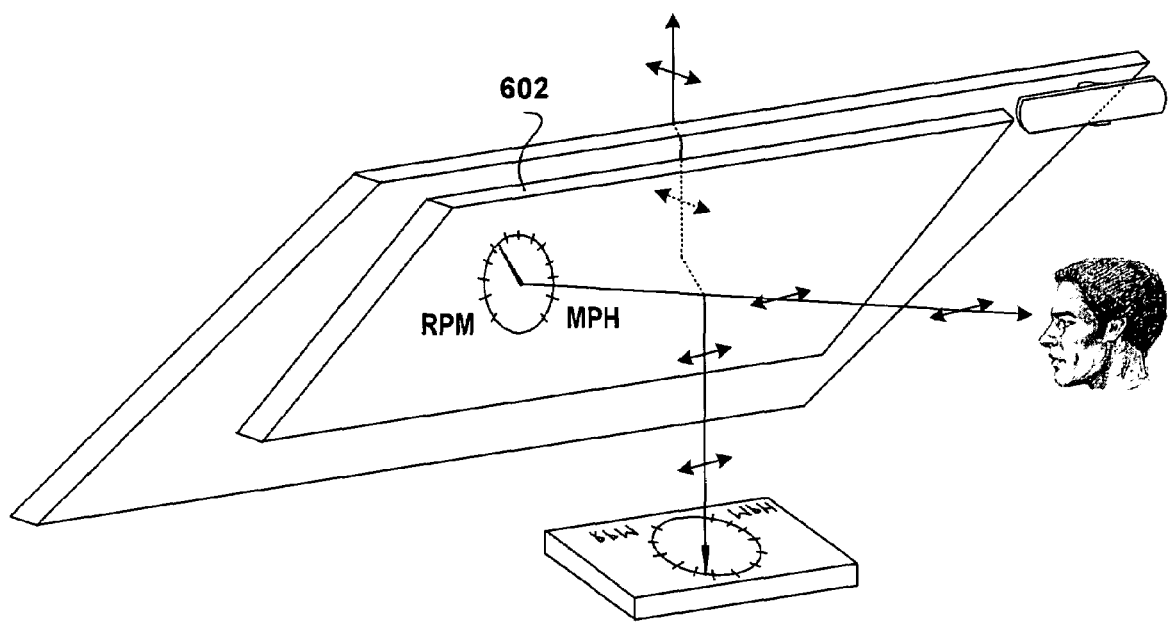
FIG. 6 shows an isometric view of a visual display system with the combiner depicted in FIG. 5.

FIG. 5 shows a visual display system with an s-polarized display projector and a half-wave retarder/combiner separate from the windshield in an automotive-HUD application. In FIG. 5, an automotive HUD includes a combiner 502, separate from the windshield, located between a dash display unit 504 and windshield 506. The combiner 502 is constructed of a birefringent material designed to act as a half-wave retarder for light 508 incident from the dash display unit. The combiner is optically transparent, neither imparting discoloration to, nor attenuating, light 510 transmitted through the windshield 506 from a given field of vision to the user 512. Incident gauge display light is p-polarized perpendicular to a plane containing the incident and reflected rays, in the case of FIG. 5, perpendicular to the plane of the figure. The angles of incidence 514 and 516 of the gauge display light is close to or equal to Brewster's angle, $\theta_b$, for both the combiner and the windshield. The combiner and windshield surfaces do not need to be exactly parallel, since a reasonably high contrast ratio can be obtained from a relatively wide range of angles of incidence, as discussed with reference to FIG. 4. Fresnel reflection from the first combiner embodiment surface permits viewing of the gauge display, which is also polarized perpendicular to the plane containing the incident and reflected rays. Light that is transmitted 518 through the combiner and windshield undergoes a 90-degree rotation of its polarization, so that the transmitted light is polarized parallel to the plane containing the incident and reflected rays at windshield surfaces. Subsequent Fresnel reflections are therefore less efficient than the first-combiner-embodiment-surface reflection, resulting in greatly attenuated ghost images 520, 521, and 522. FIG. 6 depicts an isometric view of the virtual image display embodiment shown in FIG. 5. In FIG. 6, a transparent combiner 602 eliminates potential ghosting from the transparent combiner's back surface and from both the front and back surfaces of the windshield.

Figure 7:
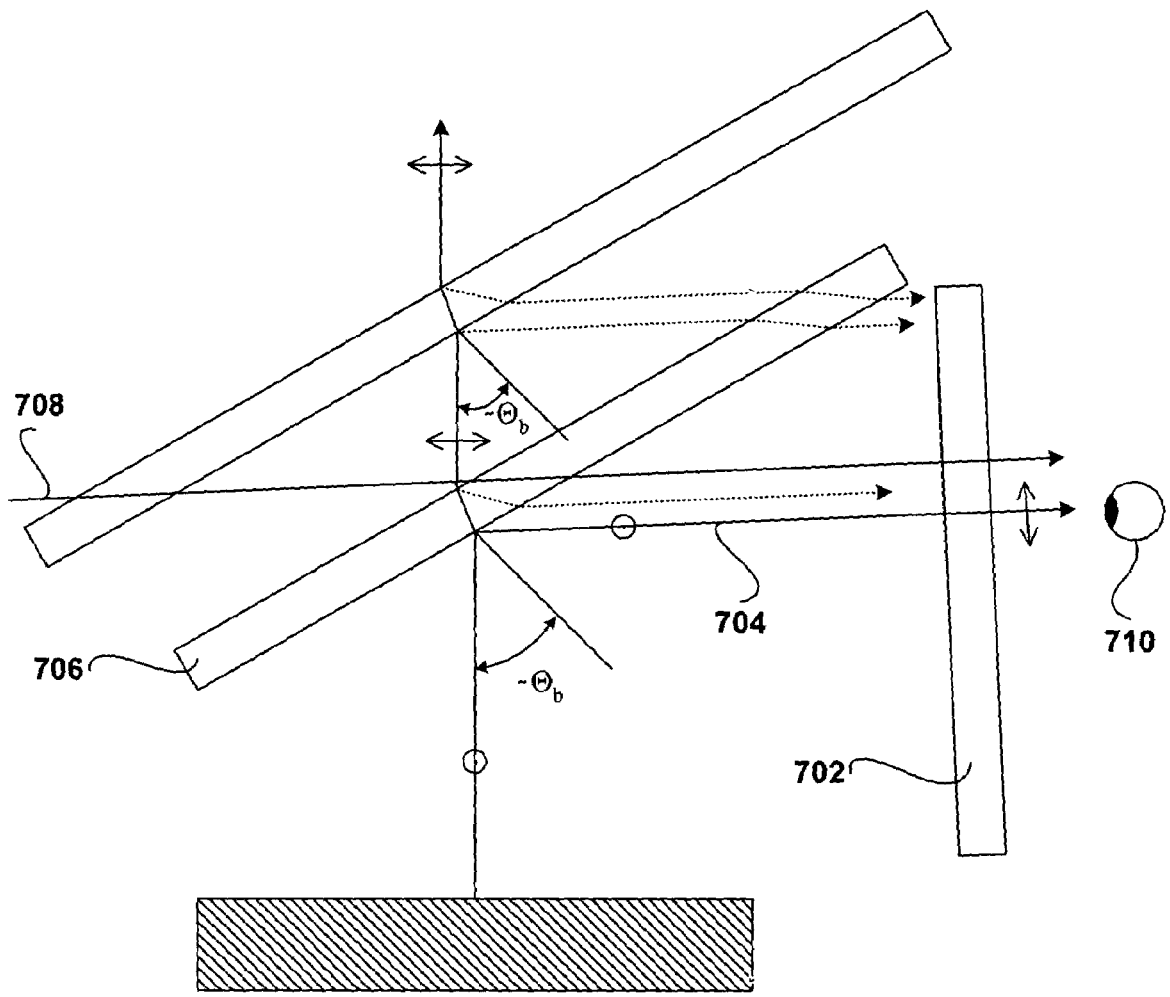
FIG. 7 shows the visual display system shown in FIG. 4 with the addition of a vision-enhancement optic.

FIG. 7 shows the visual display system shown in FIG. 4 with the addition of a vision-enhancement optic. In FIG. 7, a vision-enhancing optic 702, constructed from a birefringent material designed to act as a half-wave retarder for light 704 incident from the combiner 706, is introduced. This vision-enhancing, or relay, optic is optically transparent, neither imparting discoloration to, nor attenuating, light 708 transmitted through the windshield and combiner from a given field of vision to a user 710. The function of the relay optic is to rotate the display light polarization state so that it can be viewed with p-polarized sunglasses. The relay optic thus allows a viewer to wear sunglasses to reduce road glare, thereby reducing ambient light competition, reducing the needed level of display brightness, and causing minimal attenuation of display light, minimal attenuation of ambient light, and minimal obstruction of a user's field of vision. In addition, the relay optic may magnify the virtual image and focus the virtual image.

Figure 8:
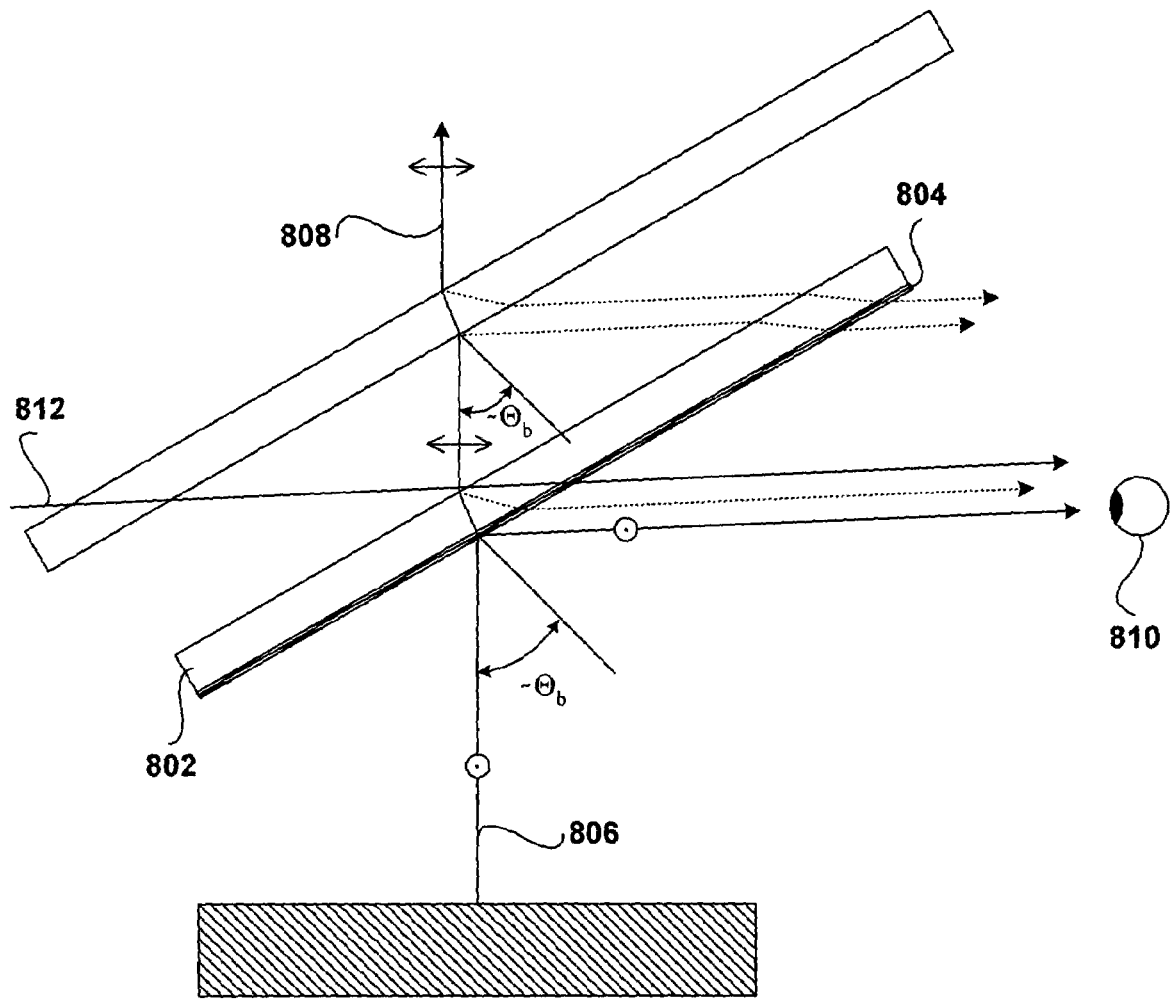
FIG. 8 shows a visual display system with an s-polarized display projector and a half-wave retarder/combiner with a thin film coating in an automotive-HUD application.

The second combiner embodiment utilizes a dielectric reflective coating. FIG. 8 shows a visual display system with an s-polarized display projector and a half-wave retarder/combiner with a thin film coating in an automotive-HUD application. In FIG. 8, the visual display system includes a combiner substrate 802 wherein the thin film coating 804 is a slightly reflecting dielectric coating on the surface adjacent to the display unit. Dielectric coatings can be designed to exhibit higher reflection efficiencies for s-polarized light than for p-polarized light. Thus, incident gauge display light 806 is polarized normal to the plane containing the incident and reflected rays in order to maximize reflection efficiency. The combiner substrate can also be constructed from a birefringent material designed to act as a half-wave retarder for incident s-polarized light, rotating the polarization of transmitted light 808 by 90 degrees, so that at all subsequent optical boundaries near Brewster's angle, the transmitted light has low Fresnel reflection efficiency, thereby greatly attenuating ghost images.

An advantage of the embodiment shown in FIG. 8 is that ghost reflections are s-polarized at the original reflecting surface and are significantly attenuated due to the higher reflection efficiency of the dielectric film to the s-polarization state. Therefore, higher reflection efficiency is realized for the primary reflection, while ghost images are extinguished. Depending upon the display brightness requirement, the combiner 802 can be disposed in a manner so that all ghost reflections pass again through the coating 804 before arriving at the view point 810. This double pass attenuation relaxes the efficiency requirement of the retarder substrate. Other advantages include the fact a single pass attenuation of light incident from the user's field of vision 812 relaxes the brightness requirement of the display because less ambient light competes with the display information. Furthermore, in an automotive HUD application, road glare tends to be dominated by s-polarized light, which is more readily deflected by the dielectric coating. Thus, the embodiment of the combiner shown in FIG. 8 may significantly reduce road glare.

The third combiner embodiment utilizes a metallic reflective coating. The thin film coating 804 shown in FIG. 8 is, in the third embodiment, a metallic coating, rather than a dielectric coating, as used in the second embodiment. In the third embodiment, a display projection system that outputs p-polarized light is used, rather than a display projection system that outputs s-polarized light, as in the second embodiment. The combiner substrate is constructed of a non-birefringent material, therefore imparting no change to the polarization state for incident light from either the display or from objects in the field of vision. The metallic coating can be designed to reflect and transmit desired amounts of light from the display and from objects within the field of vision, respectively. Transmitted light is thus p-polarized so that, upon incidence to all subsequent optical boundaries near Brewster's angle, the reflection efficiencies of the transmitted light are low compared to those of the primary reflection, greatly attenuating ghost images.

The vision enhancing optic (702 in FIG. 7) can be used in conjunction with the embodiment shown in FIG. 8. The reflective coating (804 in FIG. 8) may also be applied directly to a windshield. Antireflective coatings can be used on the opposite side of the combiner substrate, or on either side of the windshield, in the embodiments shown in FIGS. 5 and 7–8, or on the side of the windshield opposite the film in FIG. 3.

Figure 9:
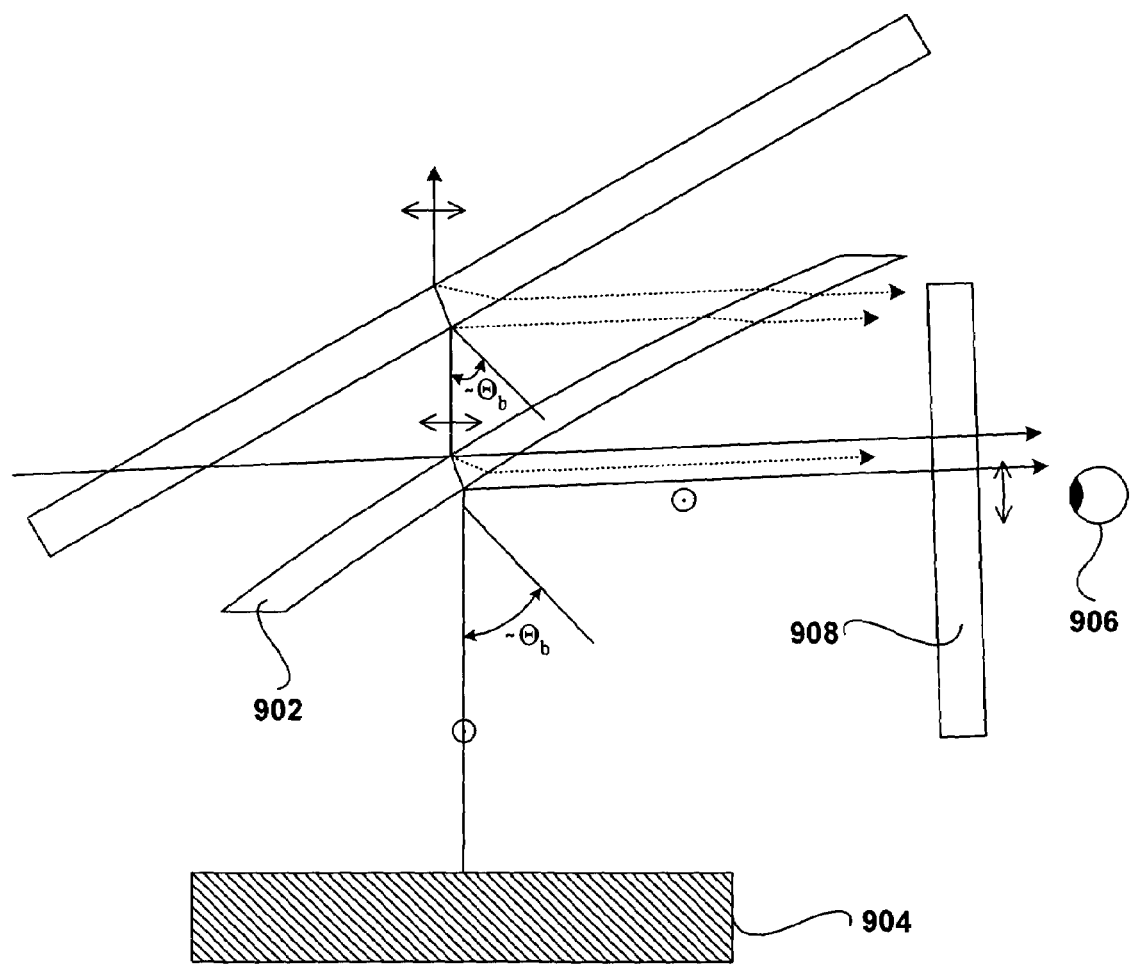
FIG. 9 shows the visual display system shown in FIG. 3 with a combiner and a vision-enhancement optic with curved surfaces for imaging.

FIG. 9 shows the visual display system shown in FIG. 3 with a combiner and a vision-enhancement optic with curved surfaces for imaging. In FIG. 9, curvature is added to the reflecting surface of combiner optic 902. The curvature is designed to be aspheric so that the display information from the display unit 904 is imaged to a virtual location and magnified appropriately. This serves to superimpose the display information onto the viewer's field of vision so that minimal refocusing of the viewer's eyes 906 is necessary. The vision enhancing optic 908 may also be designed to have one or both surfaces curved, either spherical or aspherical, in order to add optical focusing power to the system. The reflecting surface of the combiner and both surfaces of the vision enhancing optic provide three degrees of freedom in the lens design of the HUD system in order to provide virtual images with appropriate magnification, image distance, and aberration balancing for a given display 904. Furthermore, curvature on the surface opposite the reflecting side of the combiner may be used to negate the optical focusing power of the relay optic, or provide a desirable level of optical power, for objects located in the user's field of vision. Either or both of the combiner 902 and vision enhancing optic 908 may be constructed of birefringent material in order to maximize Fresnel reflection efficiency, reduce ghost images, and condition the polarization of the display information prior to its arrival at a view point 906, if necessary. The reflecting and/or refracting surfaces of both the combiner and relay optics can be fashioned as Fresnel lenses and/or reflectors.

Figure 10:
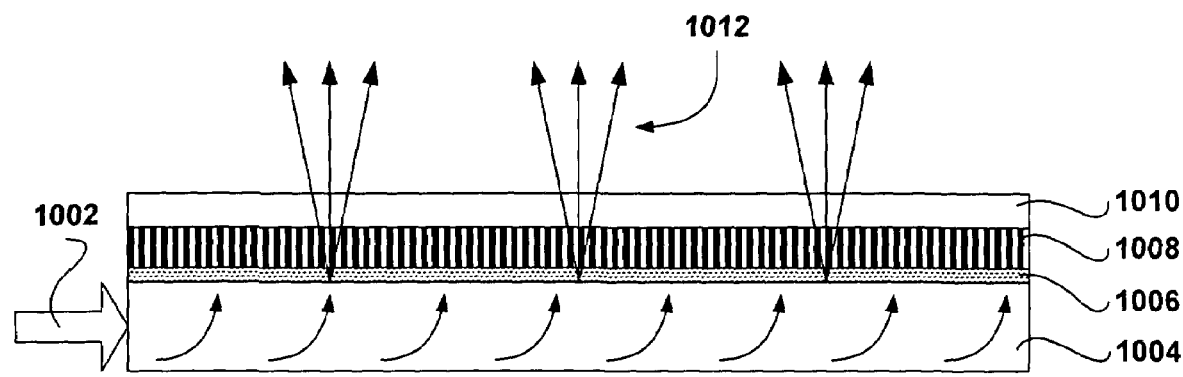
FIG. 10 shows a display projection system utilizing a light guide, diffuser, liquid crystal display, and transmitting window.

Display systems serve to project display information or otherwise illuminate an object containing information that is either graphical or textual. Embodiments of the present invention can utilize any display system that provides an object that is sufficiently illuminated with a backlight illumination system or a front-light illumination system combined with condenser optics for subsequent relay or imaging within a viewer's field of vision. FIG. 10 shows a display projection system utilizing a light guide, diffuser, liquid crystal display, and transmitting window. In FIG. 10, the depicted embodiment utilizes a high brightness illumination source 1002, a light guide 1004, a diffuser 1006, a liquid crystal display 1008, or LCD, and a transmitting optic 1010. The transmitting optic can be designed to serve various practical functions, including: (1) conditioning of the polarization of emitted light 1012 to the desired output required by the combiner optics; (2) reducing glare from the LCD surface using antireflective coatings on the surface opposite the LCD, while matching indexes of reflection of the adjacent surface and the LCD surface, to provide a protective IR-absorbing or IR-reflecting barrier between the LCD and the environment; and (3) imaging the LCD at a desired virtual distance for comfortable viewing by adding curvature to the transmitting optic 1010. Other display systems include: (1) a vacuum fluorescent display ("VFD"); (2) a laser or light emitting diode ("LED") combined with a scanning mirror, or a number of lasers, LEDs, and scanning mirrors; (3) a laser or LED combined with scanning lenses; and (4) an array of LEDs that together compose a graphical or textual display.

Although the present invention has been described in terms of a particular embodiment, it is not intended that the invention be limited to this embodiment. Modifications within the spirit of the invention will be apparent to those skilled in the art. For example, any number of different types of bireflingent coatings, materials, imaging optics, dielectric thin films, metallic coatings, and antireflective coatings may be employed, as indicated in the above-discussed embodiments, in order to provide optimal visual display systems. As discussed above, many different combiner embodiments may be employed in visual display systems of the present invention. Additional optical, electrical, mechanical, and other components may be added to the discussed embodiments to further enhance performance, characteristics, manufacturing efficiency, and other features of visual display systems using embodiments of the present invention.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A visual display system that superimposes a virtual image onto a field of vision of an occupant of a vehicle that includes a windshield, the visual display system comprising:
   a display light source that transmits an image in at least partially polarized light; and
   a combiner positioned between the occupant and the windshield that transmits light from a field of vision external to the vehicle to the occupant, the combiner
      reflecting a first portion of the display light to superimpose the image as a virtual image within the transmitted field of vision,
      rotating the polarization of a second portion of the display light, and
      transmitting the second portion of the display light through the windshield, the second portion of the light having low efficiency for reflection towards the viewer from windshield-related optical boundaries encountered by the second portion of the display light following rotation of the plane of polarization of the display light and transmission by the combiner.

2. The visual display system of claim 1 wherein the light is s-polarized, and the polarization of the light is rotated by the combiner to produce p-polarized light.

3. The visual display system of claim 1 wherein the combiner consists of a birefringent material.

4. The visual display system of claim 1 wherein the combiner is coated with a birefringent film.

5. The visual display system of claim 1 wherein the combiner is coated with a dielectric film.

6. The visual display system of claim 1 wherein the combiner is coated with a metallic film.

7. The visual display system of claim 1 used in a head-up display, providing a primary virtual image of an automotive gauge with only attenuated ghost images.

8. The visual display system of claim 1 used in a head-up display, providing a primary virtual image of an automotive gauge with no ghost images.

9. The visual display system of claim 1 used in an application selected from among:
   a see-through projection display; and
   a head-up display in a vehicle.

10. The visual display system of claim 1 further including a relay optic that rotates the polarization of the reflected, first portion of the light.

11. The visual display system of claim 10 used in a head-up display to allow a viewer to wear p-polarized sunglasses.

12. The visual display system of claim 10 wherein the display light source is selected from among:
   a display projection system utilizing a light guide, diffuser, liquid crystal display, and transmitting window;
   a vacuum fluorescent display;
   a laser or light emitting diode combined with a scanning mirror;
   a laser or light emitting diode combined with a number of lasers, LEDs, and scanning mirrors;
   a laser or LED combined with scanning lenses; and
   an array of LEDs that together compose a graphical or textual display.

13. The visual display system of claim 1 wherein the combiner is coated with both a dielectric film and a metallic film.

14. The visual display system of claim 1 wherein the combiner is applied to an inner surface of the windshield.

15. A visual display system that superimposes a virtual image onto a field of vision of an occupant of a vehicle that includes a windshield, the visual display system comprising:
   a display light source that transmits an image in an at least partially p-polarized light; and
   a combiner, coated with a metallic coating, positioned between the occupant and the windshield that transmits light from a field of vision external to the vehicle to the occupant, the combiner
      reflecting a first portion of the display light to superimpose the image as a virtual image within the transmitted field of vision, and
      transmitting a second portion of the display light, the second portion of the display light having low efficiency for reflection towards the viewer from optical boundaries encountered by the second portion of the display light following transmission into the combiner.

16. The visual display system of claim 15 used in a head-up display to allow a viewer to wearp-polarized sunglasses.

17. A method for superimposing a virtual image onto a field of vision of an occupant of a vehicle that includes a windshield, the method comprising:
   transmitting an image in an at least partially polarized light from a display light source to a combiner positioned between the occupant and the windshield that transmits light from a field of vision external to the vehicle to the occupant, the combiner reflecting a first portion of the display light to superimpose the image as a virtual image within the transmitted field of vision,
   rotating the polarization of a second portion of the display light, and
   transmitting the second portion of the display light through the windshield, the second portion of the light having low efficiency for reflection towards the viewer from windshield-related optical boundaries encountered by the second portion of the display light following rotation of the plane of polarization of the display light and transmission by the combiner.

18. The method of claim 17 employed to provide a head-up display.

19. The method of claim 17 employed to provide a see-through display projector.

20. A visual display system that superimposes a virtual image onto a field of vision of an occupant of a vehicle that includes a windshield, the visual display system comprising:
   a display light source that transmits an image in at least partially polarized light;
   a combiner that transmits light from a field of vision external to the vehicle to the occupant, the combiner
      reflecting a first portion of the display light to superimpose the image as a virtual image within the transmitted field of vision,
      rotating the polarization of a second portion of the display light, and
      transmitting the second portion of the display light through the windshield, the second portion of the light having low efficiency for reflection towards the viewer from windshield-related optical boundaries encountered by the second portion of the display light following rotation of the plane of polarization of the display light and transmission by the combiner; and
   a relay optic that rotates the polarization of the reflected, first portion of the display light to direct p-polarized light to the vehicle occupant.

* * * * *